April 13, 1954

D. S. REITZ 2,675,138

REFUSE TRUCK LOADER

Filed Sept. 8, 1949

INVENTOR
Donald S. Reitz
BY
his ATTORNEY

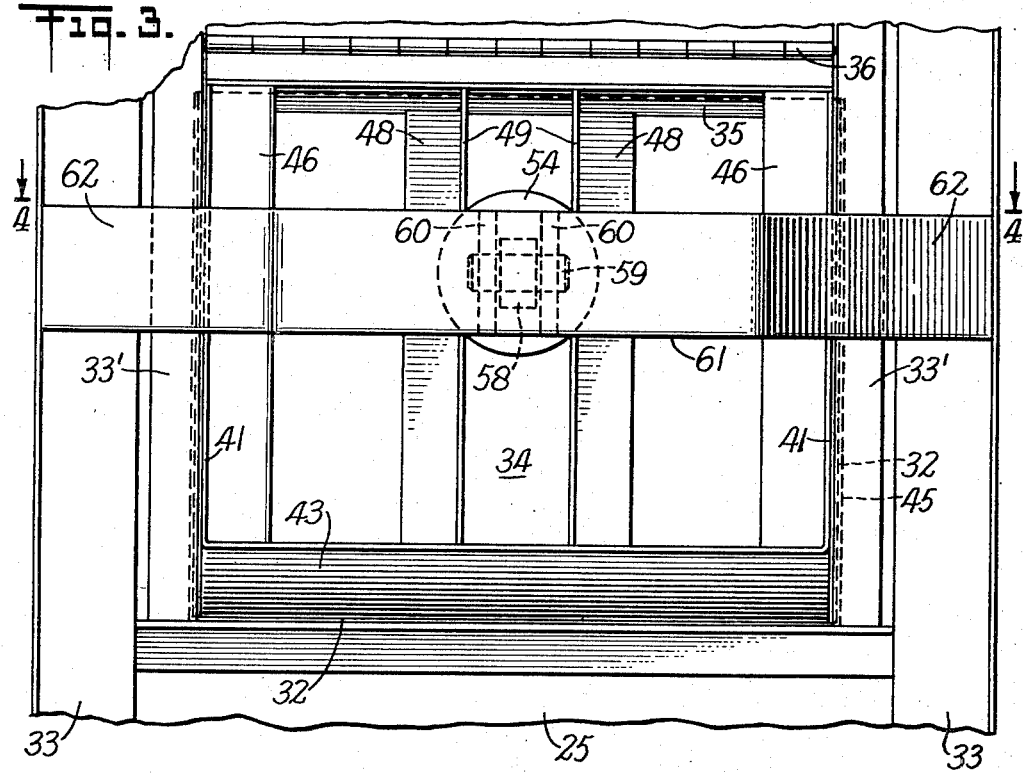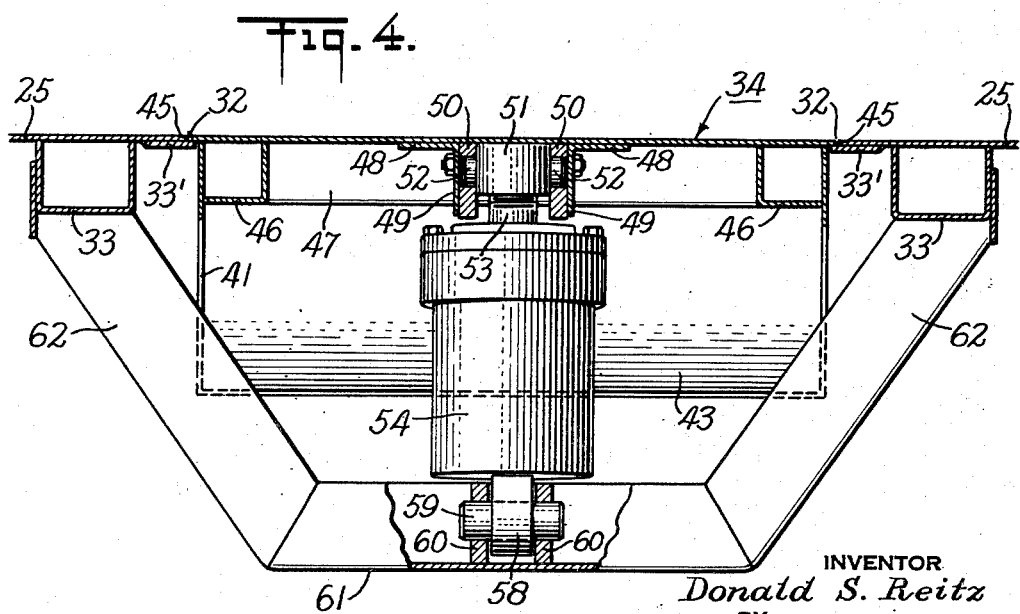

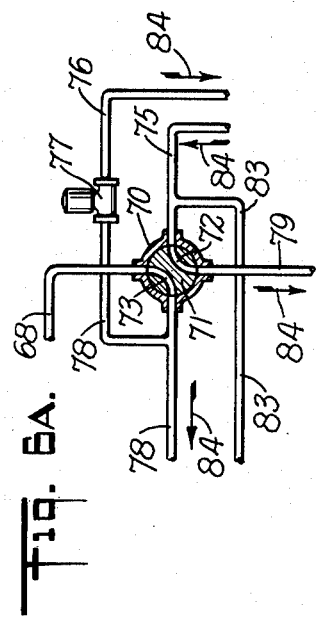

Patented Apr. 13, 1954

2,675,138

UNITED STATES PATENT OFFICE 2,675,138

REFUSE TRUCK LOADER

Donald S. Reitz, South Hempstead, N. Y., assignor to Morse Boulger Destructor Co., New York, N. Y., a corporation of Delaware Application September 8, 1949, Serial No. 114,528

7 Claims. (Cl. 214—518)

This invention relates to a refuse truck construction, and more particularly to a loader therefor.

The invention has for its object the provision of a refuse truck in which loading is effected by a power propulsion of a paddle or other shifting load member which moves and compresses the debris loaded into a hopper at a low level and forces the same at the low level point of the truck against the pressure head of the refuse filled into the truck body, as distinguished from loading devices which lift the load for deposit at an entrance opening near the top of the truck body and then distribute the same within the truck body.

The present invention concerns itself with the advantages accruing from compressing the load as it enters a low point in the truck body, whereby a higher "pay load" is carried due to the compacted condition of the debris as it enters the truck body, thereby eliminating voids and making for a volumetric capacity of greater density. As desirable as this mode of operation may be, the pressure head of the load on the loader may increase the reasonable capacity of the prime mover or source of power as the compressed column of debris encounters the roof of the truck body or deposit refuse to provide a pressure head tending to stall the prime mover in advance of filling the truck body with the debris.

It is an object of the present invention to combine with a low level loader tending to fill the truck body with a compressed or compacted charge, a tailgate construction having a shifting influence on the compressed charge which minimizes the back pressure on the low level loader, to shift the column of compressed debris or refuse entering into the body to face the loader with a yielding pressure head rather than with an incompressible pressure head.

More specifically, it is an object of this invention to overcome the difficulties encountered in loading refuse trucks with relatively incompressible masses, such as ashes and like rubbish into a truck body from a low level position by reason of the column of load being pushed or packed encountering the roof or walls and contents of the vehicle body in an unyielding mass, overloading and stalling the prime mover or requiring an unnecessarily expensive power tolerance.

It is contemplated by the present invention to limit the back pressure on low level loaders and assure a yielding column of load by shifting the load periodically or simultaneously as the column head encounters a position adjacent the roof of the truck body.

Still more particularly it is an object of my invention to provide a low level loader for truck bodies in combination with a load shifter whereby prime movers of capacities which will be economical may be employed to fill the truck bodies to maximum capacity.

Still more particularly it is an object of this invention to provide a hydraulically operated prime mover or combination of prime movers of economical design for loading a truck body at or below truck floor level and distributing it within the truck body in compressed condition to secure maximum capacity "payload" with the varieties of debris or rubbish encountered in collecting refuse.

To attain these objects and such further objects as may appear herein, or be hereinafter pointed out, I make reference to the accompanying drawing forming a part hereof, in which—

Figure 3 is an end view taken on the line 3—3 of Figure 2;

Figure 4 is a section taken on the line 4—4 of Figure 3;

Figure 6 is a diagrammatic plan view of the hydraulic pipe line system for the installation described in this invention;

Figure 6A is a fragmentary portion of the valve setting in an alternative position.

Figure 1:
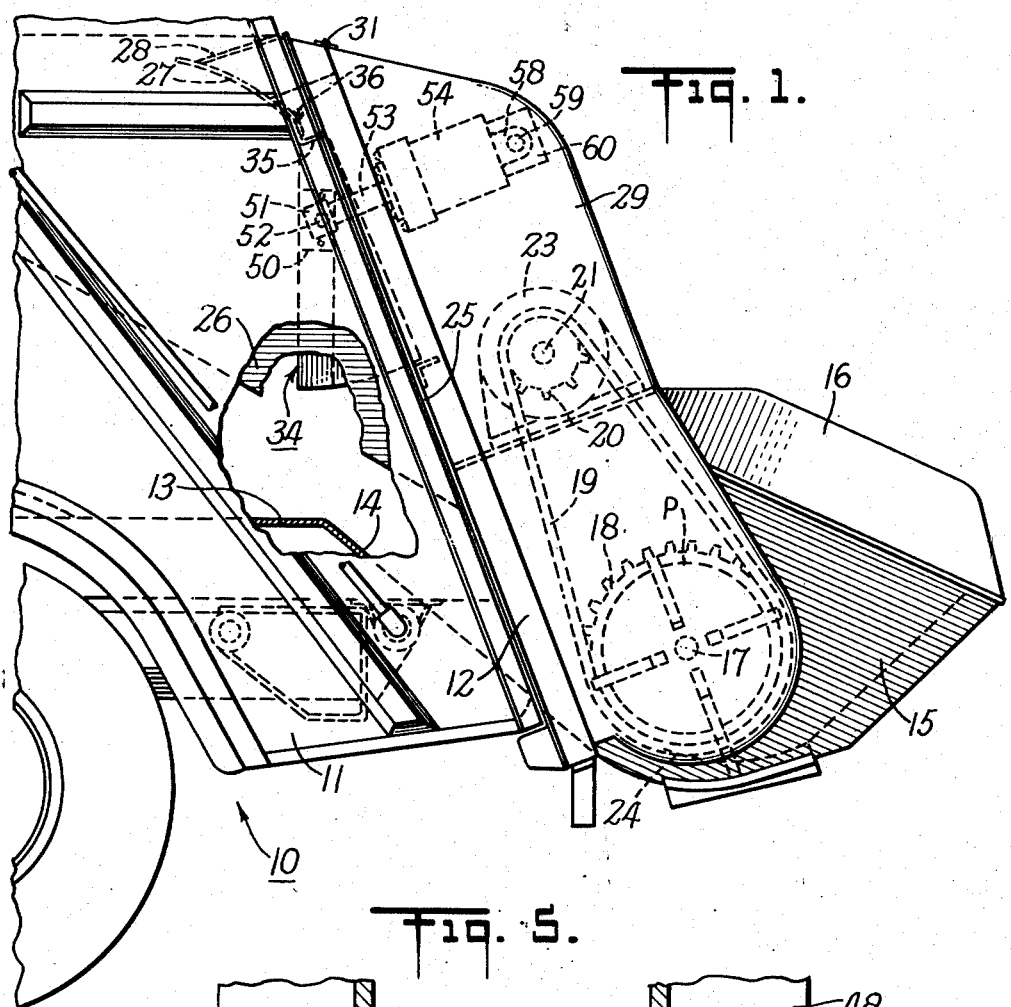
Figure 1 is a fragmentary side elevation of a refuse truck embodying the invention herein with the packer plate extended.
Figure 5:
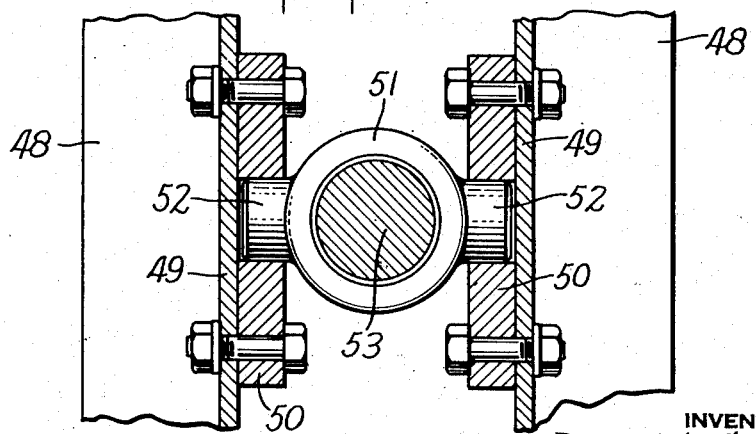
Figure 5 is a section taken on the line 5—5 of Figure 2.

The invention herein may be summarized as providing an installation for filling refuse truck bodies wherein the tailgate includes a hopper located at a low level, that is at or below the floor of the truck body, so that workmen may merely dump, with minimum lifting, the refuse collected, leaving it for a loader such as a paddle, packer, vane or rotary feeder, some operated by some prime mover, to move the contents of the hopper from the hopper into the truck body.

The invention in specific form contemplates a type of loader wherein the material entering into the hopper is compressed or compacted so that it is not scattered into the interior of the truck body, avoiding the likelihood of forming voids or a bulky mass, but, to the contrary, having the debris compressed to be formed into the truck more or less as a compacted column with a minimum amount of void space, to have a profitable "pay load," or wherein the column of compressed debris shifts before it any accumulated deposit. The device of the present invention assures a yielding pressure head on the loading mechanism by shifting the upper portion of the column of debris to avoid accumulation near the ceiling or top wall of the truck and assure a yielding pressure head for the loader.

Making reference to the drawing, there is shown a truck 10 for collecting refuse in which a body portion 11 is provided with a tailgate 12. The truck floor 13 merges at its end into an inclined fill chute 14, aligned and conforming to the throat of the tailgate hopper 15, having a filling opening 16. This filling opening, with regard to the street level, permits workmen to dump the debris in the hopper 15 without lifting the garbage cans or like containers above shoulder level.

The hopper 15 is unloaded by the packer P which is illustrated diagrammatically as a rotary loader mechanism whose trunnioned power shaft 17 has a sprocket wheel 18 connected by the chain drive 19 to the driving gear 20, deriving its source of power through the shaft 21 coupled with a speed reducer 22 and a fluid motor 23, shown diagrammatically in Figure 6.

Other forms of prime movers may be employed, as will be readily understood, the objective being to provide a low level packer P which derives a high mechanical advantage effective to take the debris and compress it, while moving it along the lower wall 24 and through the hopper to drive it along the filling chute 14 into the interior of the truck body.

With this construction it will be understood that a high compressive action and movement along the inclined chute 14 to force the refuse inwardly and forwardly along the floor 13 without compaction in combination with the other features to be herein described may be practiced, and for the latter purpose, some of the advantages of this invention may be secured without a rotary loader to move the debris along the chute 14 and accordingly oscillating plates, worms may be used, with some degree of advantage in providing a low level loader.

The tailgate 12 above the throat is provided with a deflecting plate forming an angular wall 25 which cooperates with the inclined chute 14 to shift the debris upwardly and inwardly. The major section of the wall 25 above the floor level and truck body edges are sealed off by the lateral extensions 26, forming the hinge arms for the tailgate assembly. Toward the roof of the truck body, the plate 25 merges into an arcuate deflecting canopy 27, supported by braces 28 to the tailgate housing 29, having a door 30 pivoted on the hinge 31, to give access to the prime mover assembly including the fluid-motor, speed reducer and drive shaft previously described.

The plate 25 above the throat 12 is provided with a frame opening 32 whose edges are reinforced by channels 33 and stop beads 33'. The frame opening 32 is closed by a packer plate assembly 34 which is suspended at its upper edge from the angle bar 35, having a hinge segment 36 coupled to the bracket 37 supported on the deflector plate 27. A lap joint plate 38, having an offset segment 39, covers the lower edge 40 of the canopy 27.

Figure 2:
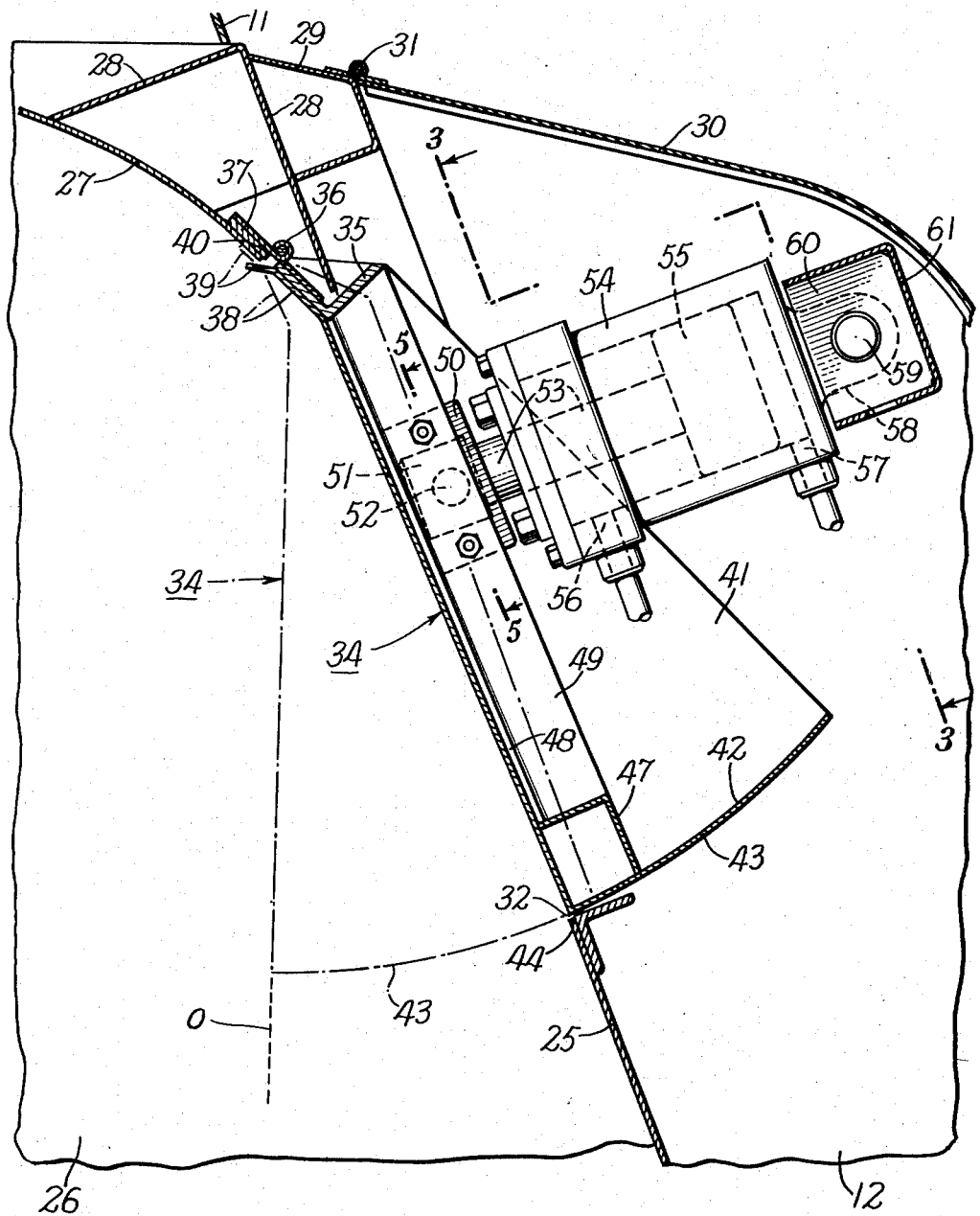
Figure 2 is a similar enlarged view as in Figure 1 with the packer plate shifted to the retracted position.

The packer plate assembly is formed with side aprons 41, merging into arcuate edges 42, closed off by the sealing plate 43, thereby covering the edge 44 of the frame opening 32, previously described, in limited swing positions of the packer plate where it may be continuous with the plate 25, or inwardly to the limiting position O shown in dotted lines in Figure 2, for a distance beyond the position of repose over the orifice, as will be explained hereinbelow.

The packer plate edges 45 overlap the stop beads 33' to provide a smooth, continuous interior surface in the normal position of the packer plate. Reinforced channels 46, 46 at the side edges, and channels 47 at the bottom edge provide a rigidly reinforced packer plate construction.

Welded on the interior face of the packer plate there are provided longitudinally thereof angle bars 48 having upright branches 49, normal to the plane of the packer plate 34 to each of which are suitably attached as by bolt bearing plates 50 to receive the thrust of the plunger head 51, whose pivot pins 52 are supported in the bearing plates 50, previously described. The plunger head 51 is connected with the piston rod 53, operating in the hydraulic cylinder 54 whose piston head 55 is arranged to be moved by the oil ports 56 and 57 to each end of the cylinder for operating the piston for retraction or pushing, respectively.

The hydraulic cylinder 54 is supported by an extension eye 58 pivotally supported on the cross pin 59 connected to the bearing plates 60 affixed to the generally U-shaped span 61, whose legs 62, 62 are supported on the reinforcing channel 33, previously described, and which surrounds the frame opening 32.

Operation of the packer just described may be understood from a consideration of the diagrammatic view of the power control transmitting system in Figures 6 and 6A. An hydraulic pump 63 is connected by the line 64 to the hydraulic tank 65. Pumped fluid leaves through the outgoing port to the line 66 through the relief valve 67, to the main feed line 68, which in the event of encountering stalling pressures may serve to by-pass the oil through the line 69 back to the hydraulic tank. The feed line connects with the control valve 70 which may be moved to one of three positions for forward, reverse or stop action.

The core 71 of the valve is arranged with a control handle for manual operation and is provided with the ports 72 and 73 which may connect the line 68 with the fluid motor 23 through the line 75. The return flow from the motor passes through the line 76 and then through a restrictor check valve 77 and the line 78, to return through the port 72 to the line 79, thereafter to the body hoist control valve 80, and from the line 81 back to the hydraulic tank. The arrows 82 show the direction of flow of the fluid circulated through the lines.

The fluid motor operates the speed reducer 22 which, in turn, drives the power shaft 17, and through the sprocket wheel 18 and chain drive 19, driving gear 20 and rotary loader P in the hopper 15, previously described.

Under a condition where the core 71 of the valve 70 has been manually positioned so that fluid passes through the line 83 to the port 56 of the cylinder 54, the system serves to retract the piston head 51 and in turn retract the packer plate 34 to a position in alignment with the tailgate 12 when normal operation is encountered.

When the rotor motor 23 is in filling operation, the refuse from the hopper 15 will be packed into the truck body along the inclined chute 14 on the floor 13. A pressure head may accumulate where a load compressed by the rotor is also moved along the inclined chute 14 and as the refuse column moves upwardly between the chute 14 and the tailgate wall 12, strikes the apron 27 or the ceiling of the truck. With highly compressed or incompressible refuse, a high "pay load" of refuse may be assured by continuously or periodically reducing the pressure head over the chute 14 and throat of the loader by the operation of the packer plate assembly 34. For this purpose, the manual control for the core of the valve 70 is placed to move the core 71 in reverse position, as shown in Figure 6A, to connect the port 72 so that it forms a continuous passage for the lines 75 and 79, which is also the return through the by-pass line 83 to the cylinder 54 and then the hydraulic tank. The port 73 forms a continuous passage between the line 68 and the line 78 leading to the port 57 thereby to project the connecting rod 53 and project the packer plate assembly 34 to the position shown in Figure 1, and to the dotted position shown in Figure 2. An alternation either manually or by a synchronized control will serve to oscillate the packer under the hydraulic pressure of the piston in the cylinder 54 during partial reversing movement of the fluid motor 23 when the packer is projected. This will be clear from the direction of the arrows 84 in Figure 6A, showing a reversal of flow of the fluid to the fluid motor 23.

Thus it will be observed, in accordance with this invention, that full advantage is taken in compressed influence with the loader R and the presentation of the compressed charge adjacent the plate 34 to shift the load and reduce the pressure head on the prime mover or loader and assuring a maximum "pay load" being packed into the truck body.

Having thus described the invention and illustrated its use, what is claimed as new and desired to secure by Letters Patent, is:

1. A refuse handling truck or the like comprising a truck body and a tailgate assembly having a low level loading hopper and a prime mover operated loader for feeding the refuse through the front of a hopper along an upwardly extending chute into the truck body and having walls aligned with the same, said loader comprising compression means to compact continually the refuse in feeding the same through the throat of the hopper, the combination therewith of a deflector plate above the chute on said tailgate having a prime mover, reciprocating means for said plate connected with said prime mover for maintaining a pre-determined pressure head on said loader by reciprocation thereof.

2. A refuse truck in accordance with claim 1 wherein a single control means is provided for said prime movers.

3. A refuse truck in accordance with claim 1 wherein a single control means is provided for said prime movers including means for alternately operating said primer movers in respect to each other.

4. A refuse handling truck or the like comprising a truck body, a tailgate assembly therefor below the truck floor level including a low level loading hopper and walls defining a throat continuous with said tailgate truck floor, a rotary loader for continually moving the load into the truck body, a prime mover operating said loader, control means for said prime mover for alternate movement of said loader forwardly or in reverse in combination with a deflector extended continuously with said tailgate wall plate above the truck floor level having a prime mover maintaining a predetermined pressure head on said loader and single control means for said prime movers.

5. In a refuse truck, a tailgate assembly including a loading throat, a hopper for said throat, hinge means for supporting said tailgate, deflector means for said hinge, said tailgate having an inner wall for continuously deflecting the load directed from said hopper through said throat, a packer plate assembly adjacent the hinge portion of said tailgate, hinge supporting means for said plate, arcuate deflecting extensions for said plate and a prime mover for moving said plate to and from wall aligned position.

6. In a refuse truck, the combination comprising a tailgate assembly, a passage adjacent the lower portion of said tailgate, a hopper for said passage including a loader, a prime mover for said loader comprising a fluid motor continually moving the load from said passage, a load shifter on the plate adjacent the upper portion of said tailgate including a frame therefor, a hydraulic piston serving as the prime mover for said plate, a single hydraulic feed for said prime movers including manually operable control means for said prime movers for alternately operating said prime movers.

7. In a refuse collecting truck, a tailgate assembly including, in combination, hinge means adjacent its upper portion for supporting said tailgate on a truck body, an angular deflector wall including a canopy adjacent said hinge means, a throat adjacent the lower portion of said wall, a hopper and loader for feeding refuse through said throat, a frame opening in said wall and a packer plate hingedly mounted adjacent the upper portion of said wall and closing said frame, side aprons for said packer plate merging into arcuate edges for sealing said plate, and a prime mover for said packer plate to and from alignment with said wall.

References Cited in the file of this patent

UNITED STATES PATENTS

| Number | Name | Date |
|---|---|---|
| 2,084,656 | Rottee | June 22, 1937 |
| 2,091,519 | Noyer | Aug. 31, 1937 |
| 2,151,886 | Barrett | Mar. 28, 1939 |
| 2,212,058 | Wood | Aug. 20, 1940 |
| 2,335,155 | Lee | Nov. 23, 1943 |
| 2,371,540 | Mott | Mar. 13, 1945 |
| 2,430,973 | Boissonnault | Nov. 18, 1947 |
| 2,488,657 | Biszantz et al. | Nov. 22, 1949 |
| 2,496,192 | Baldt | Jan. 31, 1950 |
| 2,508,877 | Walker et al. | May 23, 1950 |
| 2,509,388 | Biszantz | May 30, 1950 |
| 2,573,269 | Miller | Oct. 30, 1951 |

FOREIGN PATENTS

| Number | Country | Date |
|---|---|---|
| 825,873 | France | Dec. 16, 1937 |
| 580,706 | Great Britain | Sept. 17, 1946 |